United States Patent Office

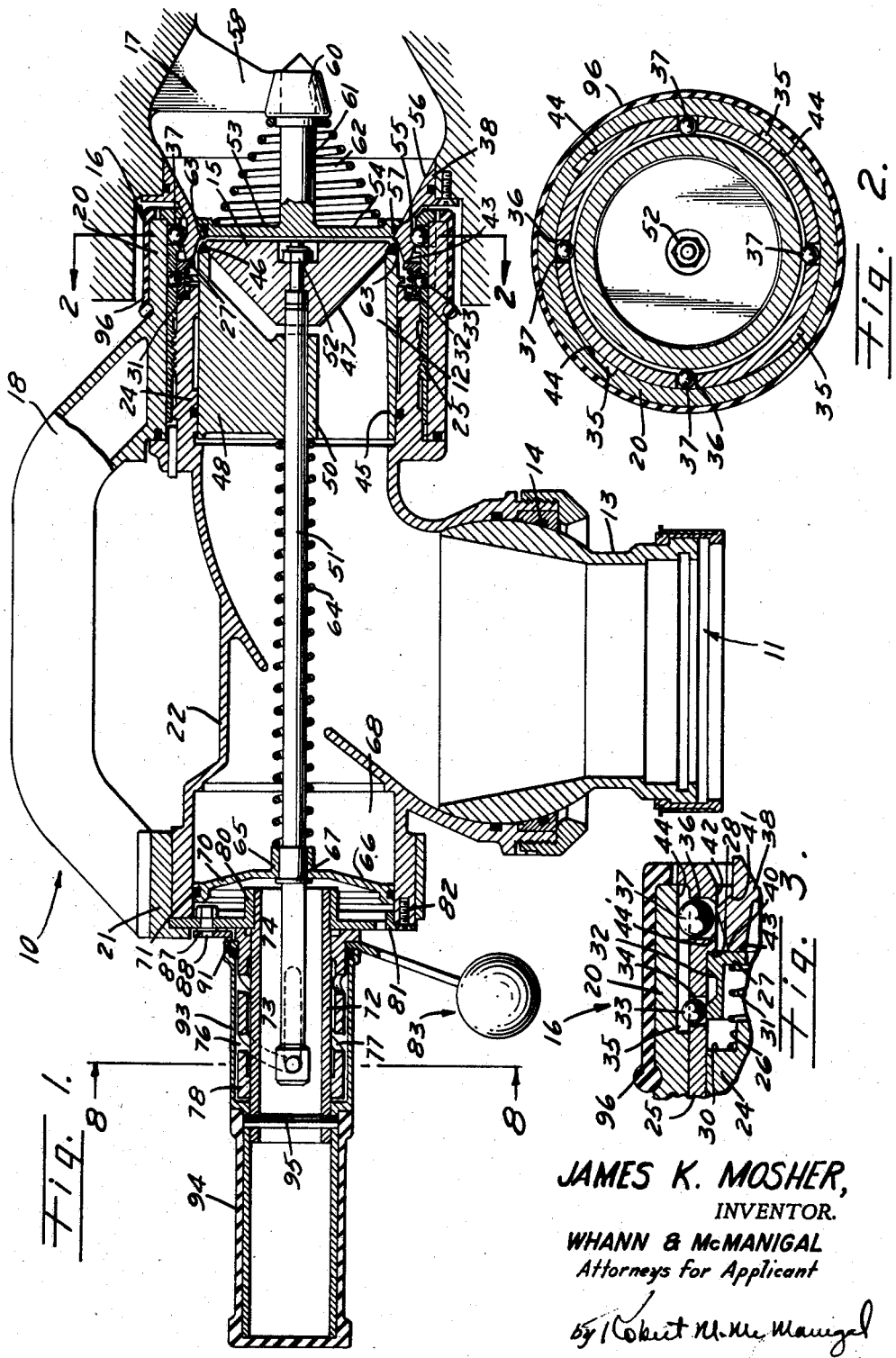

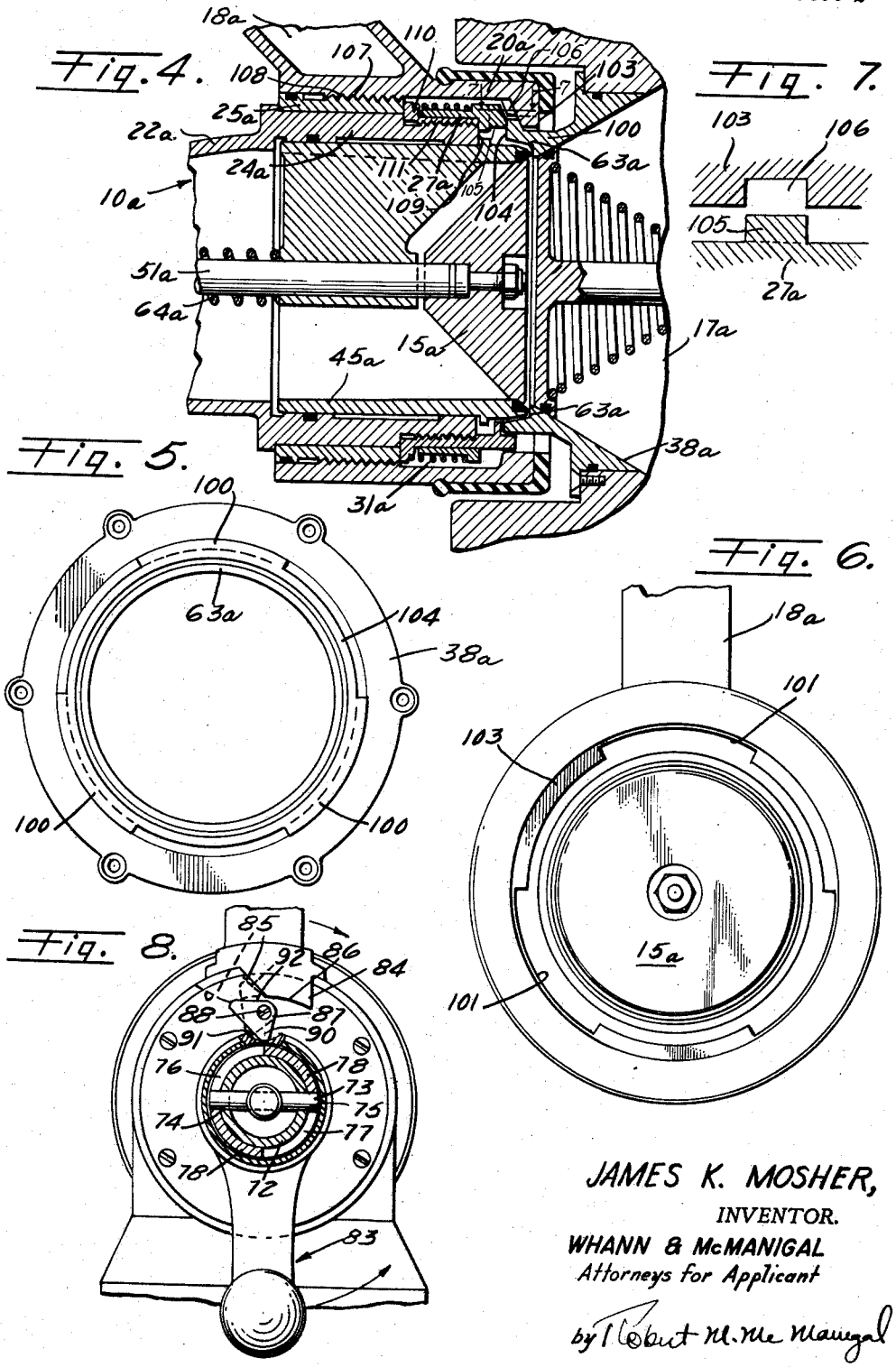

3,086,565
Patented Apr. 23, 1963

3,086,565
SERVICING NOZZLE
James K. Mosher, Pasadena, Calif., assignor to Schulz Tool and Manufacturing Co., San Gabriel, Calif., a corporation of California
Filed May 14, 1959, Ser. No. 813,095
11 Claims. (Cl. 141—347)

This invention relates, in general, to means for fueling aircraft fuel tanks and the like, and, in particular, to a new and improved nozzle adapted to cooperate with an aircraft filler pipe for filling such aircraft fuel tanks.

It is a general object of this invention to provide a new and improved service nozzle for filling aircraft fuel tanks and the like with fuel.

It is a more specific object of my invention to provide a new and improved service nozzle for filling aircraft fuel tanks and the like having a new and improved means for locking the nozzle to an aircraft filler pipe as the aircraft tank is being filled.

Another specific object of my invention is to provide a new and improved nozzle for transferring fuel to an aircraft fuel tank and the like having a new and improved means of opening and closing the nozzle including means of balancing the same against the pressure of the fuel within the nozzle being transferred to the fuel tank.

Still another specific object of my invention is the provision of a new and improved aircraft fuel nozzle for transferring fuel to an aircraft filler pipe which comprises, in combination, a new and improved means for locking the nozzle to the aircraft filler pipe and a means of pressure balancing a valve against the pressure of the fuel within the nozzle for ease of opening and closing this valve.

Briefly, my invention comprises a service nozzle, for transferring fuel from a supply of fuel under pressure to an aircraft tank and includes a new and improved means for locking the nozzle to an aircraft filler pipe as well as a nozzle valve for opening and closing the nozzle valve after the valve has been locked on the aircraft filler pipe. Means are provided for balancing the nozzle valve against the pressure of the fluid in the nozzle so that the nozzle valve may be opened and closed with ease.

In one embodiment of my invention the means for locking the nozzle to the aircraft filler pipe comprises a ball arrangement which cooperates with a flange on the filler pipe.

In another embodiment of my invention the means for sealably locking the nozzle to the aircraft filler pipe comprises a bayonet type arrangement adapted to cooperate with prongs on the aircraft filler pipe. In both embodiments, means in the form of a sleeve are provided for sealingly engaging the aircraft filler pipe when the nozzle valve is opened to prevent the leakage of fuel between the parts that are joined when the nozzle is attached to the filler pipe. Also, in both embodiments the means for balancing the nozzle valve against the pressure of the fuel in the nozzle comprises a piston connected to the nozzle and responsive to pressure within the nozzle.

Also, in both embodiments, means are provided for preventing the opening of the nozzle valve unless the nozzle is locked on the filler pipe and means are provided for preventing the unlocking of the nozzle from the filler pipe unless the nozzle valve is closed.

Therefore, it is still another and more particular object of my invention to provide an aircraft service nozzle for transferring fuel from a source of supply to an aircraft fuel tank incorporating a new and improved ball type arrangement for locking the nozzle onto the aircraft filler pipe and having a means for sealably engaging the filler pipe to prevent the leakage of fuel therefrom.

Still another object of my invention is the provision of a new and improved service nozzle having means for balancing a nozzle valve against the pressure of the fuel in the nozzle.

Still another object of my invention is the provision of an aircraft service nozzle having means to lock said nozzle on an aircraft filler pipe, a means for balancing a nozzle valve in said nozzle for ease in opening and closing said nozzle valve and means for preventing the opening of said nozzle valve until the nozzle is locked on the filler pipe and for preventing the unlocking of the nozzle from the filler pipe until the nozzle valve is closed.

Other and additional objects of my invention will be apparent to those skilled in the art from the following description when taken in connection with the accompanying drawings in which:

FIG. 1 is an elevational cross-sectional view of a nozzle, constructed in accordance with the teachings of my invention, and shown in position locked on an aircraft filler pipe but prior to the opening of the nozzle valve so that fuel may be tranferred to the aircraft filler pipe;

FIG. 2 is a cross-sectional view of a portion of the locking means of the nozzle of FIG. 1 for locking the nozzle to the filler pipe, taken along line 2—2 of FIG. 1 and looking in the direction of the arrows;

FIG. 3 is an enlarged detail view of the locking means illustrated in connection with FIG. 1;

FIG. 4 is a partial cross-sectional elevational view of another embodiment of my invention incorporating the bayonet type of locking means;

FIG. 5 is an end view of the aircraft filler pipe illustrating the lugs which cooperate with slots in the nozzle and form part of the bayonet type locking means;

FIG. 6 is an end view of the nozzle, illustrated in FIG. 4, and showing the slots for receiving the lugs on the aircraft filler pipe to lock the same thereon;

FIG. 7 is an enlarged partial view, taken as indicated by the line 7—7 of FIG. 4, of a locking ring and a portion of the nozzle itself which cooperate to prevent the nozzle handle from being turned unless the nozzle is sufficiently locked to the aircraft filler pipe; and FIG. 8 is an end view, taken along line 8—8 of FIG. 1 and looking in the direction of the arrows to illustrate the handle for opening and closing the nozzle valve and the means of locking the handle means of the nozzle so that it cannot be removed from the filler pipe until the nozzle valve is closed.

Turning now to FIGS. 1, 2 and 3 of the drawings, it can be seen that I have illustrated therein my service nozzle, indicated in its entirety as 10, and having a fuel inlet 11 and a fuel outlet 12 whereby fuel enters inlet 11 and flows outwardly through outlet 12. Inlet 11 is provided with suitable swivel joint connecting means 13 and suitable sealing means 14 for connecting the inlet to a hose (not shown). Outlet 12 is provided with a nozzle valve, indicated in its entirety as 15, which serves to close the outlet 12, and will be described in more detail hereinafter. Handle 18 is adapted to be locked, by a suitable locking means, indicated in its entirety as 16, to an aircraft filler pipe, indicated in its entirety as 17.

As can be seen in FIG. 1, the nozzle 10 is provided with a handle 18 which is grasped by the hand of the operator so as to place the nozzle on the filler pipe 17. Handle 18 is provided at its right end with a cylindrical sleeve 20 and at its left end with a shorter cylindrical sleeve 21. Sleeves 20 and 21 receive a body member 22 of the nozzle in rotatable relationship therein. Thus, the handle 18 is rotatable about the body member 22 which contains the inlet 11 and outlet 12 for a purpose to be described.

The means for locking the nozzle on to the filler pipe will now be described.

Turning now in particular to FIGS. 2 and 3, where the locking means 16 is illustrated in more detail, it can be seen that the body member 22 is formed at its right end with a cylindrical portion 24 and received in a cylindrical sleeve member 25 which, in turn, is received in the aforementioned cylindrical portion 20 of the handle member 18. The cylindrical portion 24 terminates short of, or inward of, the cylindrical member 25 and portion 20 in a stepped or cutaway portion 26. An axially slideable locking ring member 27 is received in the sleeve member 25 to axially slide between one radially inwardly extending edge 28 of the sleeve member 25 and a radially extending wall 30 of the stepped portion 26 of the cylindrical portion 24. The locking ring is axially spring-biased to the right against the ledge 28 by a helical compression spring 31. The outer periphery of the locking ring 27 is provided with a peripheral groove 32 which forms a ball receiving means for small locking ball 33.

As illustrated in FIG. 3, ball 33 is received in a hole or bore 34 in the sleeve 25 and extends radially outward of the periphery of the sleeve member. The cylindrical portion 20 is provided with an axial groove 35 to accommodate the ball 33 in its upward position. This groove serves to cooperate with the ball 33 to lock the handle 18 and prevent it from turning until the bore 34 and groove 32 are aligned to allow the ball 33 to drop into the groove 32.

The sleeve 25 is also provided with still another hole 36 outward of the hole 34 into which is received a still larger ball 37 which, too, like ball 33, may be received in the axial groove 35 so as to accommodate the left end inlet ring 38 of the filler pipe 17. As can best be seen in FIG. 3, the filler pipe inlet ring 38 is provided with a tapered entrance portion 40 and a tapered locking and exit portion 41 on its outer periphery and is of a diameter just slightly less than the entrance diameter of the sleeve member 25, as illustrated at 42, so that when the nozzle is inserted on the edge of the filler pipe inlet ring 38, the entrance tapered portion 40 will serve to urge the ball 37 upwardly in the position shown in FIG. 3. The inlet ring 38 then abuts a downwardly extending side wall 43 of the ring 27 to urge the same to the left against the pressure of the helical spring 31. In this position, the small ball 33 will drop into the groove 32 which serves to permit the sleeve 20 to be turned by the handle 18 free of the locking groove 35. At the same time that the ball 33 has dropped into the groove 32, the ball 37 will also tend to drop into the locking and exit portion 41 of the filler pipe ring 38. Thus, as the handle 18 is rotated relative to the sleeve 25 and cylindrical portion 24, the handle sleeve portion 20 containing a plurality of cams 44 will serve to urge the balls 37 into tight engagement with the filler pipe ring 38 so that the same can be locked thereon. It is to be noted that the bore 36 is formed with an inwardly extending corner 44' to prevent the ball 37 from falling out of the nozzle when not in use and while I have described only one small poppet 33 and one large poppet ball 37 cooperating with only one axial groove 35, any number of such balls and grooves may be employed, as for example, in FIG. 2 where four such balls 37 are shown cooperating with four camming surfaces 44. Furthermore, while I have described balls 37 cooperating with axial grooves 35, actually balls 37 cooperate only with the end or widest portions of cams 44 into which the grooves 35 open into, as can be more clearly seen in FIG. 2.

The means for sealing the nozzle to the filler pipe and the means for pressure balancing the nozzle valve will now be described.

Turning again to FIG. 1, it can be seen that the nozzle body 22 is provided at its right end with still another sleeve 45 which is received within the cylindrical portion 24. The sleeve 45 extends to the right outwardly and beyond the end of the sleeve portion 24 and is provided with an O-ring seal 46 peripherally about its outer end. When the nozzle valve 15 is closed, the outer periphery of the tapered surface 47 engages the O-ring seal 46 so that the latter serves as a valve seat when the nozzle outlet 12 is closed. The sleeve 45 is also provided with a radially inwardly extending web 48 which, at its radially inner end, defines a bearing means 50 for an axially slideable centrally located stem 51. This stem 51 supports, at its right end, the nozzle valve 15 suitably affixed thereto in any suitable manner as by nut means 52. Thus, as can be seen from the description thus far, movement of the stem 51 to the right serves to open the outlet 12 and movement to the left serves to close the outlet 12.

When the nozzle valve 15 is open, it engages a filler pipe poppet valve, indicated in its entirety as 53, and comprising an end plate 54, the outer diameter of which is tapered, as at 55, to engage a tapered surface 56 defining the inner periphery of the filler pipe ring 38 which serves as a valve seat for the plate 54. The outer peripheral tapered portion 55 of the plate 54 is also provided with a suitable sealing means such as an O-ring seal 57 which serves to seal the valve 53 in the filler pipe inlet ring to prevent leakage therefrom, as can be appreciated. The filler pipe itself is also provided with a filler pipe web 58 which extends radially inwardly of the pipe and terminates to define a filler pipe bearing means 60 which supports an axially slideable valve stem 61 formed integral with the plate 54 and extending normal to the plate axially of the end of the filler pipe. Stem 61 is adapted to axially slide in the bearing means 60 and the filler pipe valve itself is spring-biased by a conical helically-wound spring 62 which engages at one end against the back side of the plate 54 and at the other end against an edge of the bearing means 60 to urge the pipe valve 53 into sealing engagement with the valve seat 56 of the filler pipe so that under normal conditions, i.e., when the aircraft tank is not being filled, the filler pipe is sealed closed.

As previously mentioned, the nozzle valve 15 moves to the right or to the left depending upon the movement of the stem 51. When the nozzle valve is moved to the right it opens the nozzle outlet 12 and engages the outer surface of the filler pipe valve 53 and acting against the spring 62 opens the pipe valve so that fuel entering the nozzle inlet 11 may flow past the two valves and into the filler pipe 17. As the nozzle valve 15 moves to the right to open the filler pipe, the sleeve 45 also moves to the right following the tapered seat portion 47 of the nozzle valve until the O-ring seal 46 of the sleeve engages a lip 63 on the filler pipe ring 38. This movement of the sleeve 45 thus seals the nozzle 10 onto the filler pipe so that leakage of fuel is prevented as it is being transferred to the filler pipe. Continued movement of the sleeve is, of course, prevented notwithstanding continued movement of the nozzle valve by the lip 63.

Movement of the sleeve 45 to the right to follow the nozzle valve is accomplished by a helical spring 64 wound about the stem 51 and engaging at one end against the bearing means 48. The other end of the spring 64 engages against a mounting boss 65 of a piston 66 also mounted on the stem 51 and fixed against axial movement with respect to the stem 51 by an enlargement or washer 67. As can be appreciated, as the fuel enters the inlet 11 and flows out the outlet 12, it also fills a piston cavity 68 in the nozzle body 22, which opens into the flow path of the fuel, and acts against the right or exposed surface 70 of the piston 66. This piston is of a diameter sufficient to pressure balance the force of the fuel acting against the tapered surface 47 of the nozzle valve 15. Thus, the nozzle valve is pressure balanced against the force of the fuel and the means for opening and closing the nozzle valve can be accomplished more easily. Suitable sealing means, such as O-ring seal 71, may be used to prevent leakage beyond the piston 66.

From the description thus far, it can be seen that movement of the nozzle valve to the right opens the filler pipe by engaging and moving the filler pipe valve 53 to the right against the spring 62. This also allows the sleeve 45 to engage the lip 63 of the filler pipe and seal the nozzle thereto. When the nozzle valve 15 is moved to the left, it first engages the O-ring seal 46 of the sleeve 45 unseating the seal 46 from the lip 63 and then moves the sleeve to the left into its original or unsealing position against the spring 64. Movement of the valve to the left also allows the filler pipe valve 53 to again close by operation of the sealing means 57 engaging the filler pipe valve seat 56.

The means for opening and closing the nozzle valve 15 and the means for preventing opening of the nozzle valve until the nozzle is locked on the filler pipe as well as the means for preventing the unlocking of the nozzle from the filler pipe until the nozzle valve is closed will now be described.

Turning now and more particularly to FIGS. 1 and 8, it can be seen that the stem 51 extends to the extreme left beyond the piston 66 into an axially fixed cylindrical sleeve 72 yet is spaced from its inner periphery. The end of the stem 51 is provided with a radially outwardly extending camming pin 73 (FIG. 8) of sufficient length to extend through slots 74, 75 in the sleeve 72 and through camming slots 76, 77 in a rotatable sleeve member 78 which encompasses the fixed sleeve 72 and rotates thereon.

Sleeve 72 is immovably received in a boss 80 of a radially extending end wall 81 which, in turn, is affixed to the valve body 22 by any suitable means, such as screws 82. The camming sleeve 78, rotatable about the sleeve 72, has an outwardly extending nozzle valve handle, indicated in its entirety as 83, to rotate the camming sleeve 78. Rotation of the handle 83 counter clockwise, as illustrated in FIG. 8, will serve to rotate the sleeve 78 counterclockwise and thus the camming pin 73, being held against rotation by the slot 74, 75 of the inner sleeve 72 yet urged by the camming slots 76, 77 will move the stem to the right; slots 74, 75 being axially long enough to accommodate such movement of the camming pin. Likewise, when the nozzle handle 83 is moved clockwise, the camming pin 73, acting in the camming slots 76, 77, will move the stem to the left.

The handle sleeve portion 21 on the left end of handle 18 is provided with a downwardly or radially inwardly extending locking wall 84. As more clearly seen in FIG. 8, this locking wall 84 has a terminal or end portion 85 disposed at an angle with respect to the center or axis of the nozzle and a concentric end portion 86 concentric with the axis of the nozzle; both end portions 85 and 86 defining the end wall spaced above or a distance from the camming sleeve 78. Operatively interposed between the end portions 85 and 86 is a triangularly shaped locking toggle 87 pivotally connected at substantially one corner thereof by a bolt means 88 to the end wall 81 so as to freely pivot thereon. The one apex 90 of the triangular locking toggle is adapted to fit into a notch 91 in the camming sleeve 78 when in one position and when the handle is rotated counterclockwise will be forced to pivot about its pivot point 88 so that the side 92, opposite apex 90, is in substantial contiguous relationship with the angular end portion 85 of the locking wall 84. This position is shown in dotted lines in FIG. 8. On the other hand, when the apex 90 is disposed within the slot 91, the side 92 is in substantial contiguous relationship with the concentric wall 86 of the locking wall 84.

Thus, when the nozzle handle 18 is at its extreme left position, as it would be when the nozzle is free of the filler pipe, the end portion 86 cooperating with the wall 92 of the triangular locking toggle will lock the nozzle handle 83 and prevent the same from turning so that the nozzle valve 15 is prevented from opening. The locking position of the locking wall 84 is shown in dotted lines in FIG. 8. When the nozzle handle 18 is rotated clockwise to lock the nozzle onto the filler pipe in a manner heretofore described, the locking wall 84 will be in a position substantially, as shown in FIG. 8, so that the triangular locking toggle 87 will then be free of the end wall 86 and the nozzle valve handle 83 may be rotated counterclockwise urging the locking toggle into a position free of the notch 91. At the time that the nozzle valve handle 83 has urged the locking toggle 87 out of the notch 91, it also provides an interference between the locking wall 84 and the toggle and the camming sleeve 78 so that the nozzle handle 18 cannot be unlocked from the filler pipe while the nozzle valve 15 is in its open position. Thus, when it is desired to remove the nozzle from the filler pipe, the locking toggle 87 and the locking wall 84, cooperating with the camming sleeve, requires that the nozzle valve 15 be closed by a clockwise rotation of the nozzle valve handle 83 so that the locking toggle may drop into the notch 91.

One complete operation of the nozzle will now be described briefly.

When it is desired to fill the aircraft fuel tank the nozzle 10 is inserted onto the filler pipe ring 38 so that the end of the ring 43 urges the locking ring 27 to a position where the small poppet balls 33 are free of the locking grooves 35 which had held the valve handle 18 in a position where the locking wall 84 prevented the locking toggle 87 from being urged out of the notch 91. When the balls 33 are thus free of the locking notches 35, the nozzle handle 18 may be rotated clockwise so that the camming surfaces 44 urge the large poppet balls 37 to lock the nozzle onto the filler pipe. Since rotation of the handle 18 frees the locking toggle of the locking wall 84 the handle 83 may be rotated counterclockwise to open the nozzle valve 15.

When it is desired to remove the nozzle from the filler pipe, it is first required that the nozzle valve 15 be closed by reason of the fact that the locking toggle 87 will prevent the turning of the handle 18 as aforesaid. When the nozzle valve is closed by the turning of the handle 83 clockwise, the nozzle handle 18 may then be rotated counterclockwise so that the locking wall 84 locks the locking toggle in the slot 91 and, at the same time, the locking grooves 35 are aligned so that the large poppet balls 37 may be retracted thereinto. When this happens the nozzle may be removed from the filler pipe ring 38 and at the same time the locking ring 37 will urge the small poppet balls 33 into the locking grooves 35 to thus prevent the turning of the handle 18 which, in turn, prevents the opening of the valve by the positioning of the locking wall 84 as aforesaid.

As can be seen in FIG. 1, the camming sleeve 78 and inner sleeve 72 are encompassed in an external or outward cover sleeve member 93 which extends from substantially the nozzle valve handle 83 outwardly and beyond the end of the inner sleeve member 72 and is suitably covered at one end thereof with any suitable type of material for protection, such as plastic or rubber cover means 94. Outer sleeve member 93 is affixed to the sleeve 72 in any suitable manner, such as by pin 95, to prevent its removal from the nozzle.

Also the cylindrical piston 20 may be provided with suitable protecting means, such as plastic or rubber cover 96, when desired.

From the above description, it can be seen that I have disclosed a nozzle having a nozzle valve which opens and closes a filler pipe valve and which is provided with the means of locking the same on the filler pipe for filling the aircraft tank. This nozzle also includes a means of sealing the nozzle as well as locking the nozzle on the filler pipe and is provided with a means preventing the nozzle valve from being opened when the nozzle is not locked and sealed on the filler pipe and preventing the nozzle from being unlocked from the filler pipe until the nozzle valve is closed. These safety features are important to the effective operation of the nozzle, as can be appreciated.

Turning now to the other embodiment of my invention, attention is directed to FIGS. 4-7.

In FIG. 4, I have shown my nozzle only fragmentarily since the remainder of the nozzle is shown and described in connection with FIGS. 1–3 and 8. In these FIGURES, 4–7, parts having the same function and operation are given the same reference numerals as in the previously described figures, execpt that the suffix "a" is provided since their operation is now sufficiently understood and need not be further described. Thus, it can be seen in the fragmentary showing—FIG. 4—that the nozzle valve 15a cooperates with and is operatively disposed in a sleeve 45a which, in turn, is received in a sleeve portion 24a for opening and closing and sealing the nozzle 10a. The filler pipe ring 38a, however, differs from the filler pipe ring 38 of FIG. 1 in that it is provided at its outer end with radially outwardly extending bayonet type prongs 100 (three shown in FIG. 5). As the nozzle 10a is inserted onto the filler pipe 17a, the prongs 100 are received in bayonet type slots 101 (three shown in FIG. 6) formed in a downwardly extending end wall 103 of the sleeve portion 28a. The outer edge 104 of the filler pipe ring 38a engages locking ring 27a to urge the same to the left against the operation of a spring 31a normally urging locking ring 27a to the right. Ring 27a, being provided with a plurality of outwardly extending prongs or dogs 105 (FIG. 7) to be received in slots 106 in the end wall 103 to lock the sleeve portion 20a thereto, are thus freed of these slots 106 to permit the turning of the sleeve portion 20a.

When dogs 105 are thus freed of the slots 106, the handle 18a may be turned counterclockwise (in the manner similar to handle 18) so as to receive prongs 100 behind the end wall 103 of sleeve portion 20a. Rotation of the handle 18a in a counterclockwise direction also serves to move the sleeve portion 20a to the left by operation of internal threads 107 formed thereon which cooperate with external threads 108 on sleeve 25a. The threads, being left-handed threads, change the relative position of sleeves 24a and 25a with respect to sleeve portion 20a so that the prongs 100 are tightened against the outer edge of the locking ring 27a which, in turn, is abutted against the outside edge or end 109 of the sleeve 24a. In this position, the nozzle valve 15a may be opened since the nozzle is locked on the filler pipe and the sleeve 45a will engage the lip 63a on the filler pipe ring 38a and the locking means and the nozzle valve handle, described in connection with FIGS. 1 and 8 serve to operate in the manner similar to that previously described. Conversely, when the nozzle valve 15a is closed and the locking means shown in FIG. 1 for preventing the turning of the handle 18a until the nozzle valve 15a is closed, is rendered inoperative, the handle 18a can then be turned counterclockwise so that the prongs 100 of the filler pipe ring 38a are free to be moved outward through the slots 102 so that the nozzle can be removed from the filler pipe. At the same time, the spring 31a urges the locking ring 27a to the right so that the dogs 105, being realigned by movement of the handle 18a engage in the slots 106 so that turning of the handle 18a with respect to the body member 22 is prevented. This, in turn, locks the nozzle valve 15a closed in a manner similar to that described in connection with FIGS. 1 and 8. It is to be noted also in connection with this embodiment that an additional sleeve 110 is interposed between sleeves 24a and 25a and is suitably threaded to the sleeve 24a, as at 111, for ease in assembly and any suitable means are provided, such as a groove and projection to prevent ring 27a from rotating so that when the ring is locked with the sleeve portion 20a the sleeve is held immovable with respect to the body 22a.

While the various parts herein have been described as in an upper or a lower position or in a left or right position, such description refers only to the relative parts, as shown in the drawings and is not intended to be a limitation of the invention; it being understood that the appended claims should be construed as broadly as the prior art will permit.

I claim:
1. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means including ball camming means for locking said nozzle to said filler pipe; means for opening and closing said nozzle valve, said nozzle valve being connected to directly open said poppet valve as it is being opened to permit fuel to enter said filler pipe; and means including second ball camming means for preventing the opening of said nozzle valve until said nozzle is locked on said filler pipe.

2. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means for locking said nozzle to said filler pipe; means for opening and closing said nozzle valve and for opening said poppet valve; slidable opposing face means in axial alignment with and for balancing said nozzle valve against the pressure of the fuel in said nozzle for ease in opening and closing said nozzle valve; means for preventing the unlocking of said nozzle until said nozzle valve is closed; and means including rotary and ball camming means for preventing the opening of said nozzle valve until said nozzle is locked on said filler pipe.

3. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means including bayonet type locking means on said nozzle and filler pipe for locking said nozzle to said filler pipe; means for opening and closing said nozzle valve and for opening said poppet valve; opposing face means in axial alignment with and for balancing aid nozzle valve against the pressure of the fuel in said nozzle for ease in opening and closing said nozzle valve; means for preventing the unlocking of said nozzle until said nozzle valve is closed; and means including axially directed means releasable by said bayonet means on said filler pipe for preventing the opening of said nozzle valve until said nozzle is locked on said filler pipe.

4. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means including ball camming means for locking said nozzle to said filler pipe; means for opening said nozzle valve and said poppet valve by displacement of each in the same direction with respect to said nozzle; means for balancing said nozzle valve against the pressure of the fuel in said nozzle for ease in opening and closing said nozzle valve; means for preventing the unlocking of said nozzle until said nozzle valve is closed; and means including second ball camming means for preventing the opening of said nozzle valve until said nozzle is locked on said filler pipe.

5. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means for locking said nozzle to said filler pipe; means associated with said nozzle for opening and closing said nozzle valve and for moving said nozzle valve into said filler pipe to open said poppet valve to permit fuel to enter said filler pipe; and movable seal means, which, in one position provides a valve seat for said nozzle valve and in another position provides a seal between said nozzle and said filler pipe when said nozzle is locked to the filler pipe and the nozzle valve is open.

6. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means including a bayonet type locking means for locking said nozzle to said filler pipe; means associated with said nozzle for opening and closing said nozzle valve and for moving said nozzle valve into said filler pipe to open said poppet valve to permit fuel to enter said filler pipe; and movable seal means, which, in one position provides a valve seat for said nozzle valve and in another position provides a seal between said nozzle and said filler pipe when said nozzle is locked to the filler pipe and the nozzle valve is open.

7. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means including ball camming means for locking said nozzle to said filler pipe; and means including second ball camming means for preventing the opening of said nozzle valve until said nozzle is locked on said filler pipe.

8. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means including bayonet-type locking means on said nozzle and filler pipe for locking said nozzle to said filler pipe; means for opening and closing said nozzle valve and for opening said poppet valve; means for preventing the unlocking of said nozzle when said nozzle valve is open; and means including axially directed means releasable by said bayonet means on said filler pipe for preventing the opening of said nozzle valve until said nozzle is locked on said filler pipe.

9. A nozzle for refueling an aircraft fuel tank or the like having a filler pipe connected to said tank, means to connect said nozzle to said filler pipe, said nozzle comprising: means defining a nozzle inlet and a nozzle outlet, said nozzle inlet being adapted to be connected to a supply of fuel whereby fuel enters said inlet and flows out of said outlet; means defining a nozzle valve for closing said nozzle outlet; means associated with said nozzle for opening and closing said nozzle valve; and movable seal means, which, in one position provides a valve seat for said valve and in another position provides a seal between said nozzle and said filler pipe when said nozzle is connected to the filler pipe and the valve is open.

10. A refuel nozzle for refueling an aircraft fuel tank or the like having a filler pipe connected to said tank and a poppet valve in said filler pipe for opening and closing said filler pipe, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means for locking said nozzle to said filler pipe; means for opening and closing said nozzle valve, said last mentioned means while opening said nozzle valve displacing it toward said poppet valve to open it and to permit fuel to enter said filler pipe; and sliding means within said nozzle adapted for movement against said filler pipe when said nozzle valve is open for sealing said nozzle to said filler pipe when locked so as to prevent leakage of fuel as fuel flows out said outlet into said filler pipe.

11. A refuel nozzle for refueling an aircraft fuel tank or the like having a filler pipe connected to said tank, said refuel nozzle comprising: means defining a nozzle inlet and a nozzle outlet, said nozzle inlet being adapted to be connected to a supply of fuel whereby fuel enters said inlet and flows out said outlet; means defining a nozzle valve for closing said nozzle outlet; means for locking said nozzle to said filler pipe; rod means associated with said nozzle for opening and closing said nozzle valve; piston means on said rod means for substantially fully balancing said nozzle valve against the pressure of the fuel in said nozzle for ease in opening and closing said nozzle valve, said piston means being slidably and sealingly engaged within a chamber in said nozzle so as to slide within said chamber when said rod means is actuated, said chamber being open to said inet and said outlet; and means supported on said piston means and said rod means for sealing said valve when it is closed.

References Cited in the file of this patent

UNITED STATES PATENTS

| | | |
|---|---|---|
| 1,172,739 | Roehrich | Feb. 22, 1916 |
| 2,041,735 | Young | May 26, 1936 |
| 2,461,312 | Dahlem | Feb. 8, 1949 |
| 2,548,354 | Davies | Apr. 10, 1951 |
| 2,630,822 | Davies | Mar. 10, 1953 |
| 2,753,884 | Lindsay | July 10, 1956 |
| 2,772,706 | Petau | Dec. 4, 1956 |
| 2,778,391 | Muller | Jan. 22, 1957 |
| 2,836,207 | Griswold | May 27, 1958 |
| 2,901,008 | Covett et al. | Aug. 25, 1959 |